(12) United States Patent
Cook

(10) Patent No.: US 10,902,556 B2
(45) Date of Patent: Jan. 26, 2021

(54) COMPENSATING FOR DISPARITY VARIATION WHEN VIEWING CAPTURED MULTI VIDEO IMAGE STREAMS

(71) Applicant: Nvidia Corporation, Santa Clara, CA (US)

(72) Inventor: David Cook, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/036,350

(22) Filed: Jul. 16, 2018

(65) Prior Publication Data
US 2020/0020076 A1     Jan. 16, 2020

(51) Int. Cl.
*G06T 3/40* (2006.01)
*G06T 19/00* (2011.01)
*H04N 13/344* (2018.01)

(52) U.S. Cl.
CPC .......... *G06T 3/4038* (2013.01); *G06T 19/006* (2013.01); *H04N 13/344* (2018.05); *G06T 2207/10012* (2013.01)

(58) Field of Classification Search
CPC .............. G06T 3/4038; G06T 19/006; G06T 2207/10012; G06T 2207/10021; G06T 2207/20228; G06T 5/00; H04N 13/161; H04N 13/344; H04N 19/70; H04N 13/117; H04N 2013/0081; H04N 13/383; H04N 13/204; H04N 13/128; H04N 13/178; H04N 13/221; H04N 13/378; H04N 13/271; G02B 27/0093; G02B 27/017; G02B 27/2228; G02B 2027/0134; G02B 2027/0138; G06F 3/011; G06F 3/013

See application file for complete search history.

(56) References Cited

U.S. PATENT DOCUMENTS

| | | |
|---|---|---|
| 6,449,309 B1 | 9/2002 | Tabata |
| 7,884,823 B2 | 2/2011 | Bertolami et al. |
| 8,049,786 B2 | 11/2011 | Pan et al. |
| 9,143,727 B2 | 9/2015 | Williams |
| 9,361,668 B2 | 6/2016 | Ishigami et al. |
| 9,485,494 B1 * | 11/2016 | Cole .................... H04N 19/597 |

(Continued)

OTHER PUBLICATIONS

"User Manual"; Mettle Skybox & Skybox Studio; www.mettle.com; undated; 15 pgs.

(Continued)

*Primary Examiner* — Maurice L. McDowell, Jr.
*Assistant Examiner* — Donna J. Ricks

(57) ABSTRACT

The disclosure is directed to a method to compensate for visual distortion when viewing video image streams from a multiple camera capture of a scene where the method determines the disparity difference utilizing the user view orientation and then compresses and/or stretches the left and/or right eye video image streams to compensate for the visual distortion. In another aspect, the method describes additional adjustments and corrections to the video image streams including rotating, tilting, shifting, and scaling the video image streams, and correcting for gapping and clipping visual image artifacts. In another aspect, a visual compensation system is described to implement the method. Additionally, a visual compensation apparatus is disclosed to perform the method operations.

24 Claims, 7 Drawing Sheets

(56) References Cited

U.S. PATENT DOCUMENTS

| | | | |
|---|---|---|---|
| 9,762,893 B2 | 9/2017 | Barron et al. | |
| 10,154,243 B2* | 12/2018 | He | H04N 13/128 |
| 2002/0122113 A1* | 9/2002 | Foote | G06T 3/4038 |
| | | | 348/48 |
| 2012/0236114 A1* | 9/2012 | Chang | G06T 7/50 |
| | | | 348/43 |
| 2013/0307928 A1* | 11/2013 | Choe | H04N 13/122 |
| | | | 348/43 |
| 2014/0098186 A1* | 4/2014 | Seidl | G06T 15/10 |
| | | | 348/36 |
| 2014/0300634 A1* | 10/2014 | Cho | G06T 19/00 |
| | | | 345/633 |
| 2015/0358539 A1 | 12/2015 | Catt | |
| 2016/0088280 A1 | 3/2016 | Sadi et al. | |
| 2016/0353089 A1 | 12/2016 | Gallup et al. | |
| 2017/0118458 A1 | 4/2017 | Gronholm et al. | |
| 2017/0287215 A1 | 10/2017 | Lalonde et al. | |
| 2017/0295353 A1* | 10/2017 | Hwang | G06T 3/00 |
| 2019/0164354 A1* | 5/2019 | Sasaki | G06T 19/00 |

OTHER PUBLICATIONS

Chiu; "How to Edit 360 Video in Adobe Premiere Pro CC"; knight lab; Northwestern University; Storytelling Layers on 360 Video; Spring 2017; 10 pgs.

\* cited by examiner

COMPENSATING FOR DISPARITY VARIATION WHEN VIEWING CAPTURED MULTI VIDEO IMAGE STREAMS

TECHNICAL FIELD

This application is directed, in general to a virtual reality display process, and, more specifically, to correcting a generated stereoscopic image when a user's view direction differs from the in-line image view direction.

BACKGROUND

Unlike mono images that show the same image to both eyes, stereo images provide a different view to each eye. Similarly, stereoscopic video provides video from different perspectives to each eye of a viewer for a realistic viewing experience. For an immersive viewing experience, stereoscopic video can be captured to provide a 360 degree virtual reality environment. Virtual reality 360 degree (VR/360) camera rigs can be used to capture 360 degrees of stereoscopic video to allow a virtual reality experience for viewers.

SUMMARY

In one aspect, the disclosure provides a method compensating for visual distortion of scene images captured by multiple cameras. In one embodiment, the method includes: (1) receiving a left eye video image stream of the scene images from a first camera perspective and a right eye video image stream of the scene images from a second camera perspective, (2) receiving directional information to indicate a user view direction relative to at least one of the left eye video image stream and the right eye video image stream, (3) determining a first disparity parameter utilizing the directional information and an in-line view direction from at least one of the left eye video image stream and the right eye video image stream, and (4) calculating an adjusted left eye video image and an adjusted right eye video image, for each pair of video images in each respective video image stream, utilizing the first disparity parameter, wherein the calculating comprises one of a stretching and compressing, for at least one of the left eye video image stream and right eye video image stream.

In another aspect, the disclosure provides a system to compensate for a user perceived distortion of a scene captured by multiple cameras. In one embodiment, the system includes: (1) a video receiver, capable to receive a first and second video image stream of the scene, where the second video image stream is captured proximate to the first video image stream and at substantially a same time, (2) a data receiver, capable to receive a user view direction of the scene, wherein the user view direction is relative to an in-line view direction of the first video image stream and second video image stream, and (3) a processor, capable of determining a first disparity parameter utilizing the user view direction and the in-line view direction, and capable of adjusting the first video image stream and second video image stream utilizing the first disparity parameter, wherein the adjusting comprises at least one of stretching and compressing of video image streams, and the adjusting applies to at least one of the video image streams.

In yet another aspect, the disclosure provides a computing apparatus to correct user perceived distortion of a scene captured by multiple cameras. In one embodiment, the computing apparatus includes: (1) a storage device capable of storing at least a first video image stream and second video image stream of the scene received from the multiple cameras, and an adjusted left eye video image stream and an adjusted right eye video image stream of the scene, (2) a data receiver capable of receiving a user view direction of the scene, wherein the user view direction is relative to an in-line direction of the first video image stream and the second video image stream, (3) a video processor capable of generating the adjusted left eye video image stream and the adjusted right eye video image stream utilizing the first video image stream and second video image stream and the received user view direction, wherein the generating comprises at least one of non-linear stretching and non-linear compressing of respective of the video image streams, and the generating applies to at least one of the left eye video image stream and right eye video image stream, and (4) a video stitcher capable of generating a generated stereoscopic video image stream utilizing the adjusted left eye video image stream, the adjusted right eye video image stream, and the received first and second video image streams.

BRIEF DESCRIPTION

Reference is now made to the following descriptions taken in conjunction with the accompanying drawings, in which:

FIGS. 1A-B are illustrations of images of example camera rigs that are used to capture video image streams;

DETAILED DESCRIPTION

Figure 1B:
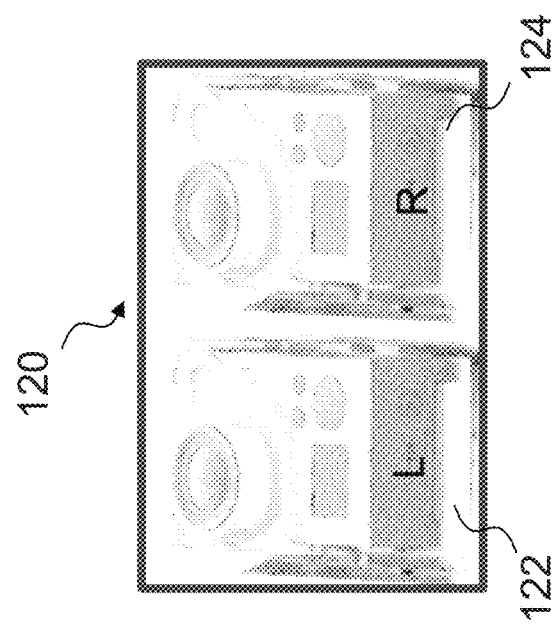

Various events or locations, such as sporting events, music concerts, the Grand Canyon, and the ocean, can be captured by VR/360 camera rigs for virtual reality (VR) viewing that is transmitted live, delayed, or recorded for playback at a future time. For the VR experience, a user can view the captured video on a VR display device, such as a VR headset. A user utilizing a VR display device can experience a more immersive visual experience since the VR display device can provide a three dimensional (3D) view of the event.

There can be issues with the 3D view of an event or location. One type of issue can occur when a user turns their eyes to look to the side of a 3D view. When the angle of viewing is not lined up with how the cameras captured the original event, then a video processor would need to process one or more of the camera video images, i.e., video image streams or video streams, and blend, i.e., stitch, them to create the 3D view for the user. An issue can occur due to the way the cameras used to capture the scene are configured. Fields of view captured by each camera can overlap the fields of view of other cameras in the camera rig by varying amounts, the field of view of each camera can vary as to the angle captured, the angle of coverage, or spacing, of each camera in the camera rig can vary, and other configuration factors can contribute to the issues. The blending process can introduce a visual artifact, i.e., distortion, which can be noticeable by the user viewing the 3D view. Another issue can occur where the differing depths of objects can cause distortions and artifacts of the 3D view. For example, a distant object can appear closer than it should because of the way the various camera video image streams are blended to form the VR 3D image.

This disclosure addresses visual distortions that can be introduced when processing the video image streams by analyzing how the user is viewing the VR 3D view, i.e., the angle of the user's eyes compared to the angle of how the video image streams were originally captured, analyzing the video image streams that are to be blended, and adjusting one or more of the video image streams to counteract the distortion to bring the VR 3D view closer to a non-distorted view for the user. Here, closer is intended to be a point where the distortion is no longer, or minimally, perceivable by an average user. This adjustment can be implemented by stretching and/or compressing one or more of the video image streams, so that the relative, i.e., user perceived, distance between two video image streams remains close in value as the user turns their eyes to look at different parts of the overall VR 3D view.

The described method and system can be implemented at various points in the video input/output stream. For example, part or all of the disclosed features can be implemented at the point the video input is being captured by the camera rig, where the video input is being stored (such as in a server or data center location), and in a cloud environment. Alternatively, the system can be implemented local to the user, for example, a local storage area, a local video processing system, and in a VR display device used by the user. A combination of these locations can be utilized via communicative coupling, such as storing the video in a cloud storage location, having the video image streams adjusted by a video processor local to the user, and being displayed on a user VR display. Other combinations are also possible.

Figure 1A:
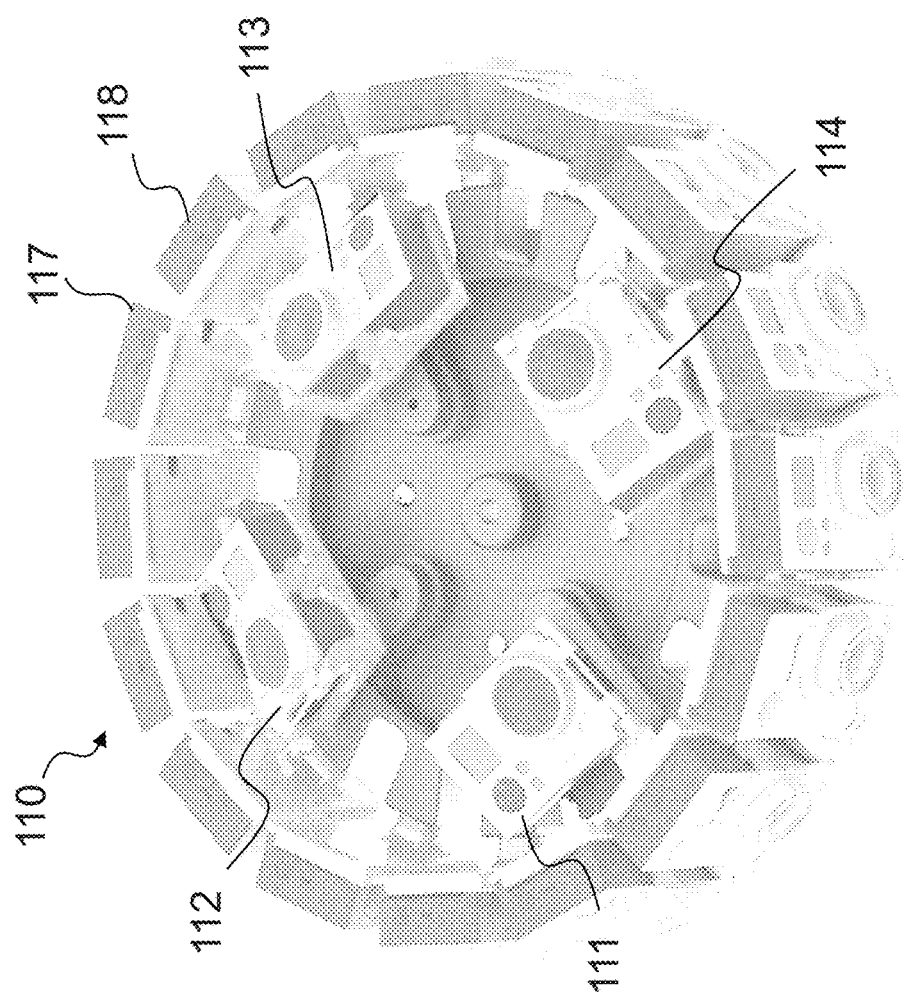

Video scenes, e.g., images and segments, can be captured using a camera apparatus, or rig, having two or more cameras arranged in various fashions. FIG. 1A and FIG. 1B illustrate images of multiple camera rigs that can be utilized to capture video image streams of a scene, such as, a sporting event, a concert, or another event type. The video image streams can be presented as a live event, a delayed event, and a previously captured and recorded event that is played back at a later time. The video image streams can be captured at, or substantially at, the same time by the cameras in the camera rig. The terms video image and video image stream represent the images that are being viewed by a user. For this disclosure, photo pairs, i.e., still images taken as a stereo photo pair, can also be considered and applied to this disclosure.

FIG. 1A illustrates a radially aligned camera rig 110, including four zenith orientated cameras 111, 112, 113, 114, and neighboring cameras 117 and 118. Neighboring cameras 117 and 118 are an example of neighboring cameras that can be selected by the process. The video image streams from cameras 117 and 118 can be rotated and tilted to bring them in-line with each other so the remaining compensation for disparity method steps, described herein, can be applied.

FIG. 1B illustrates a rectangular camera rig 120 with two cameras already aligned. Camera 122 is designated as the left view perspective and camera 124 is designated as the right view perspective. These perspectives are designated from a standard orientation. Should the camera rig orientation be changed, for example, upside down, then the designations can also be changed to accommodate the new orientation. FIGS. 1A and 1B are example camera rigs. Additional types of camera rigs can be utilized, such as a camera rig with eight radially aligned cameras, and cameras with or without zenith and nadir cameras. Other types of camera rigs can be utilized as well. The angle of capture for the cameras can vary as well. For example, a typical angle capture arc is 45°. Angle capture arcs up to 180° can be used.

When viewing the captured images from two neighboring camera views, such as cameras 117 and 118, or cameras 122 and 124, a stereoscopic perspective can be shown to a user when the user is looking straight out from the camera lens perspective. This is an in-line view direction (in-line view vector), i.e., a perpendicular vector extending from a plane of the video image perspectives (see, for example, FIG. 2, elements 220 and 222).

As a user moves their head to either side, a visual distortion of the scene image occurs as the disparity (measured by the disparity parameter), i.e., the distance between the relative left and right eye view vectors, decreases. This reduction in disparity parameter value results in the image appearing to move closer to the user, thereby reducing the stereoscopic view effect. This effect can be observed by a user with slight change in user view angle. Typically, a 10° to 20° angle change between the in-line video image direction and the current user view direction can be noticeable by a user.

This disclosure relates to a method and system to correct for this video image distortion. As the left and right eye view perspectives (selected from two neighboring cameras) are received, the system will also detect the direction at which the user is viewing the video image streams. The user view direction is measured from the in-line view direction vectors extending straight out from at least one of the two neighboring cameras.

To correct the user perceived distortion, the disparity between the left and right eye user views can be increased to be closer in value to the disparity parameter when viewing in the in-line direction of the left and right video image views. This can be done by stretching and compressing the left and right video image to provide the appropriate depth perspective within the video image streams, when they are stitched together for user viewing. For example, if the user is looking to the right, then the left video image can be compressed and the right video image can be stretched. Looking to the left, the process uses an opposite compression/stretching scheme.

The amount of compression and stretching is an inverse proportion to the amount of the disparity parameter. For example, a disparity parameter equaling the original disparity parameter, i.e., the user is viewing the video image stream in an in-line view direction, will result in a compression or stretching of zero. As the disparity parameter approaches zero, the amount of compression or stretching increases. For example, every x number of pixels, on a horizontal line, can be changed, such as doubling or dropping the $x^{th}$ pixel, and other schemes can be utilized as well. The variable x can vary from one to the width of the video image in pixels. In some aspects, the amount of the adjustment can be divided into two equal parts where one video image stream is compressed by the divided part and the other video image stream is stretched by the divided part.

The determined proportional adjustment (compression or stretching) of the video image determined by the disparity parameter, can be applied to the video image proportionally as well, i.e., a non-linear adjustment process. The non-linear compression or stretching can be based on the width of the video image, where a greater proportion of the adjustment can be applied to one side of the video image with a gradual decrease in video image adjustment as the adjustment process moves to the other side of the video image. For example, if the right video image is being stretched, the right edge of the right video image can be unchanged, while the left edge of the right video image is significantly changed. The remaining portions of the right video image can proportionately increase the amount of stretching change from the right edge to the left edge of the image (see, for example, FIG. 3, elements 316, 317, and 318).

Additional video image adjustments can be included in the final video image streams sent to the video stitcher. These adjustments can include correcting for gapping and clipping. The two selected video image streams selected for the left and right eye perspectives can typically have an overlapping margin. This margin can be utilized, along with the other captured video image data, to provide the video image data that can be used to correct for gap and clip video image artifacts.

Further, when a video image stream is captured utilizing a camera rig, such as shown in FIG. 1A, the captured video image streams, selected from two neighboring cameras, can have a different spatial orientation. The video image adjustment process can include the ability to rotate, tilt, scale, shift and otherwise bring the two selected video image streams into an approximate spatial alignment where further processing can be applied.

The camera rig can utilize cameras using a wide angle lens to capture a greater field of view. If, for example, the camera rig utilizes cameras with a 180° degree field of view, then a user can turn their head 90° degrees to either side and be looking at the images generated by the two cameras selected for this view of a scene. As the user view angle approaches 90°, the disparity parameter between the left and right eye view perspectives approaches zero. In another aspect, the camera rig can have a sufficient number of cameras arranged radially that the maximum user view angle can be less than 180°; typically, the maximum user view angle is 45°. At the maximum user view angle, the process changes to a different set of two neighboring cameras. Neighboring cameras can be proximate to each other and do not need to be adjacent to each other. For example, the camera view selection steps can determine that the two camera video inputs to use for this process can have an intervening camera video input which is not used, e.g., using a sequential numbering of the camera video inputs, video inputs 1 and 3 can be used, ignoring video input 2.

The video data collected from the camera rig forms the video image streams. Typically, there is one video image stream for each camera input, while other combinations are possible. A video image stream typically has many video images that when viewed sequentially appears as the video image stream. The video images equate to the frames shown. The process to correct for the distortion, along with other processes for the video image streams, can be able to maintain a sufficient frames per second (FPS) output to maintain the user experience. Twenty-four to thirty FPS is typically a minimum accepted throughput. In some embodiments a throughput of sixty FPS is used. In addition, the compensation for distortion method attempts to maintain the resolution of the originally captured video image streams. For example, if the video image streams were captured at a 3,840 pixels across 2,160 lines (2160p or 4K) resolution, then the final stitched output can also be at a 4K resolution.

Figure 2:
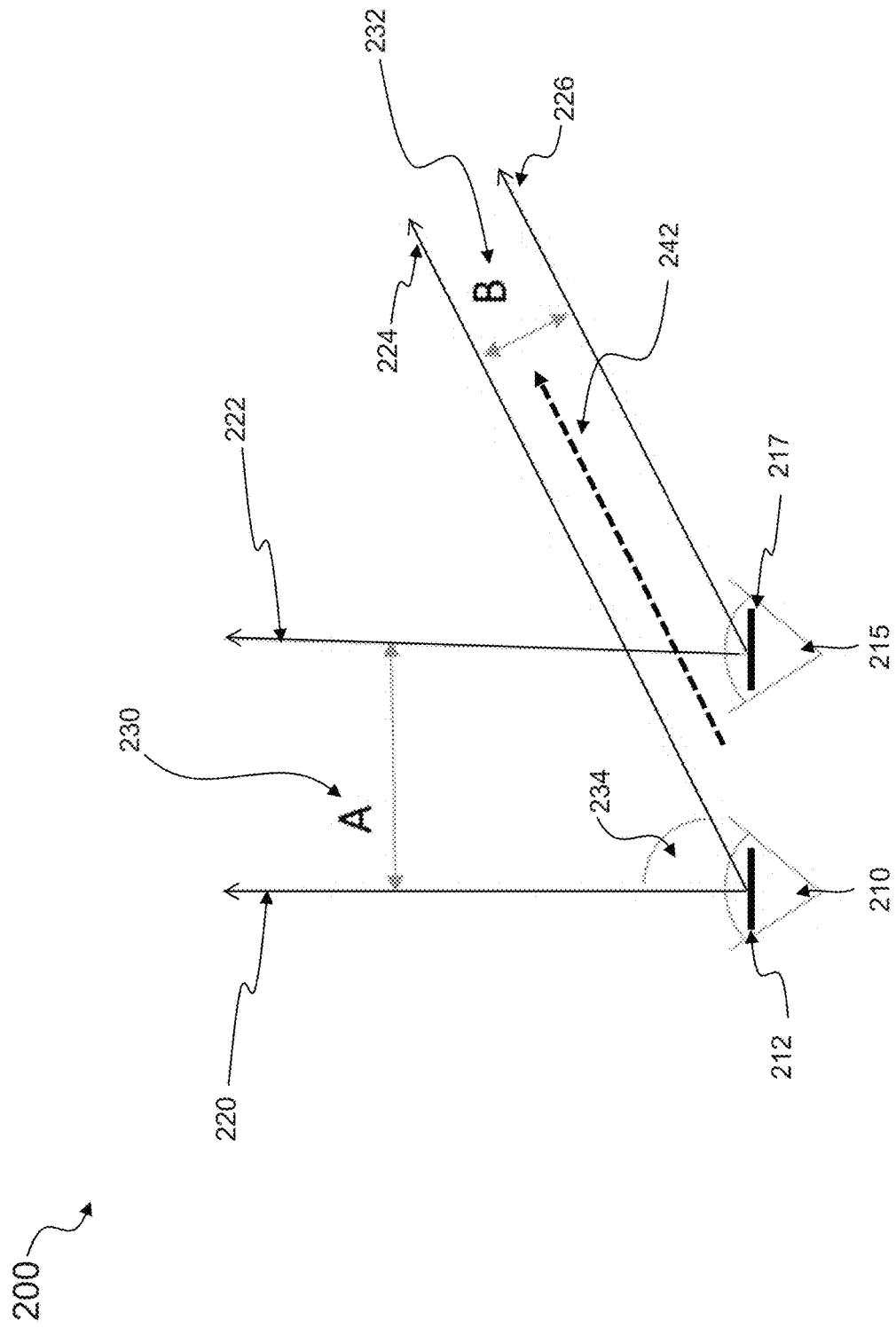
FIG. 2 is an illustration of a diagram of an example user view direction differing from an in-line view direction.

FIG. 2 is an illustration of a diagram 200 that provides an example of the difference between a user view direction and an in-line, i.e., perpendicular, view direction, and demonstrates a user perceived disparity difference between a left and right video image stream pair. A first camera perspective can be assigned as the left video image stream 210, e.g., the left eye perspective. A second camera perspective can be assigned as the right video image stream 215, e.g., the right eye perspective. Extending as the in-line viewing direction from left video image stream 210 is a left eye vector 220 that is a perpendicular vector from the left video image stream's 210 video image plane 212. Similarly a right eye vector 222 is a perpendicular vector, i.e., the in-line viewing direction for right video image 215, relative to the right video image plane 217.

The distance between the centers of the left video image stream 210 and the right video image stream 215 is labeled as disparity 'A' 230. Disparity 'A' 230 is the distance between the left eye vector 220 and the right eye vector 222. If the left eye vector 220 and the right eye vector 222 are not parallel vectors, then the system can rotate, tilt, shift, and scale either one or both of the left video image stream 210 and the right video image stream 215 to bring the left eye vector 220 and the right eye vector 222 into substantially parallel alignment.

A user can turn their eyes and/or head slightly to look at the stitched video image stream at some angle from the in-line view direction. If a user changes the view direction a significant amount, then the system can select a different set of first and second video image streams to meet the user's needs. For this disclosure, the system is continuing to use the original first and second video image streams. A user device can detect a new user view direction 242, represented by the dashed line in FIG. 2, to which the user has changed the user view, relative to the left video image stream 210 and right video image stream 215 video image stream perspectives. In this example, the user view direction 242 is to the right of the vectors 220 and 222. This disclosure applies equally to a user view direction to the left of vectors 220 and 222 with the appropriate changes to the right/left labels in the remaining descriptions below. This change in viewing direction can be represented by a user view angle 234. The user view direction 242 creates a set of parallel user view vectors 224 and 226, originating from the same center point of planes 212 and 217 as the respective left eye vector 220 and right eye vector 222 originated. The direction of the view vectors 224 and 226, matches the user view direction 242. The disparity distance between view vectors 224 and 226 is labeled as disparity 'B' 232.

In this example, disparity 'A' 230 is larger than disparity 'B' 232. When stitching together the left and right video image streams 210 and 215, the difference in disparity between 'A' 230 and 'B' 232 creates a distortion in the stitched generated stereoscopic video image stream. For example, elements within the video image can appear closer to the user than originally captured by the first and second camera perspectives.

To correct this distortion, the left 210 and/or right 215 video image streams can be adjusted. In this example, since the view angle is to the right of the in-line or perpendicular view direction, the system can compress the left video image stream 210, stretch the right video image stream 215, or perform multiple compression and stretching functions on the respective video streams. By modifying the video images, the perceived (relative) disparity 'B' 232 increases to better approximate the original disparity 'A' 230. This has the effect of removing or lessening user perceivable distortion from the stitched generated stereoscopic video image. In some aspects, the system can attempt to recover the "no distortion" view, meaning that a goal is bring 'B' 232 to be equal to 'A' 230. In other aspects, the system can attempt to reduce the distortion so that 'B' 232 approaches, and does not equal, 'A' 230.

The compress and stretch adjustments are made in proportion to the user view angle 234 and in proportion to the width of the respective video image stream being adjusted. The user view angle 234 can range from 0° (zero degrees), i.e., the in-line view direction represented by vectors 220 and 222 and the user view direction are the same, to 90°, i.e., the user view direction is perpendicular to the in-line view direction, represented by vectors 220 and 222. As the user view angle 234 increases from 0.0° to 90.0°, the amount of compression and/or stretching applied to the respective video image streams increases. The proportionality is dependent on the camera rig layout and the capabilities of each camera used to capture the left 210 and right 215 video image streams. For example, in some aspects, in cases where angle 234 is 0°, the adjustment to the video image stream is 0%. As angle 234 reaches 45°, the adjustment to the video image is approximately 50%, proportional to the original image. In some aspects, an example formula can be used, such as [the percentage of adjustment]=50*tan (angle 234). In another aspect, the compression and/or stretching can be applied linearly or non-linearly to the respective image. The determination of the type of compression/stretching to apply can be based on the size of the user view angle 234. In some aspects, the range of depth in the view can be utilized to determine the amount of non-linearity to be applied. For example, a greater depth range can lead to a greater proportion of non-linearity of the adjustment applied to the video image stream.

In another aspect, the video image streams can be proportionally adjusted according to the width of the video image. The edge of the video image closest to the other video image, for example, in diagram 200, the left side of the right video image 215, can be stretched more on a per pixel basis than the center of the right video image stream 215. The right side of the right video image stream 215 is stretched minimally to the point where the right edge of the right video image is not stretched. The proportionality described herein applies equally to the compression of the left video image, with the left/right labels reversed.

In another aspect, the system can perform other types of corrections to the left 210 and right 215 video image streams. For example, the system can take image data from the right video image stream 215 to cover gapping video image artifacts that can be apparent in the left video image stream 210 when it is compressed. Also, the system can take image data from the left video image stream 210 to cover clipping video image artifacts that can be apparent in the right video image stream 215 when it is stretched.

Diagram 200 is an example of a user view angle 234 to the right of the in-line view directions. If the user view direction changes to the left of the in-line view directions, then the same process described above applies, except that the left/right labels are swapped throughout the descriptions.

Figure 3:
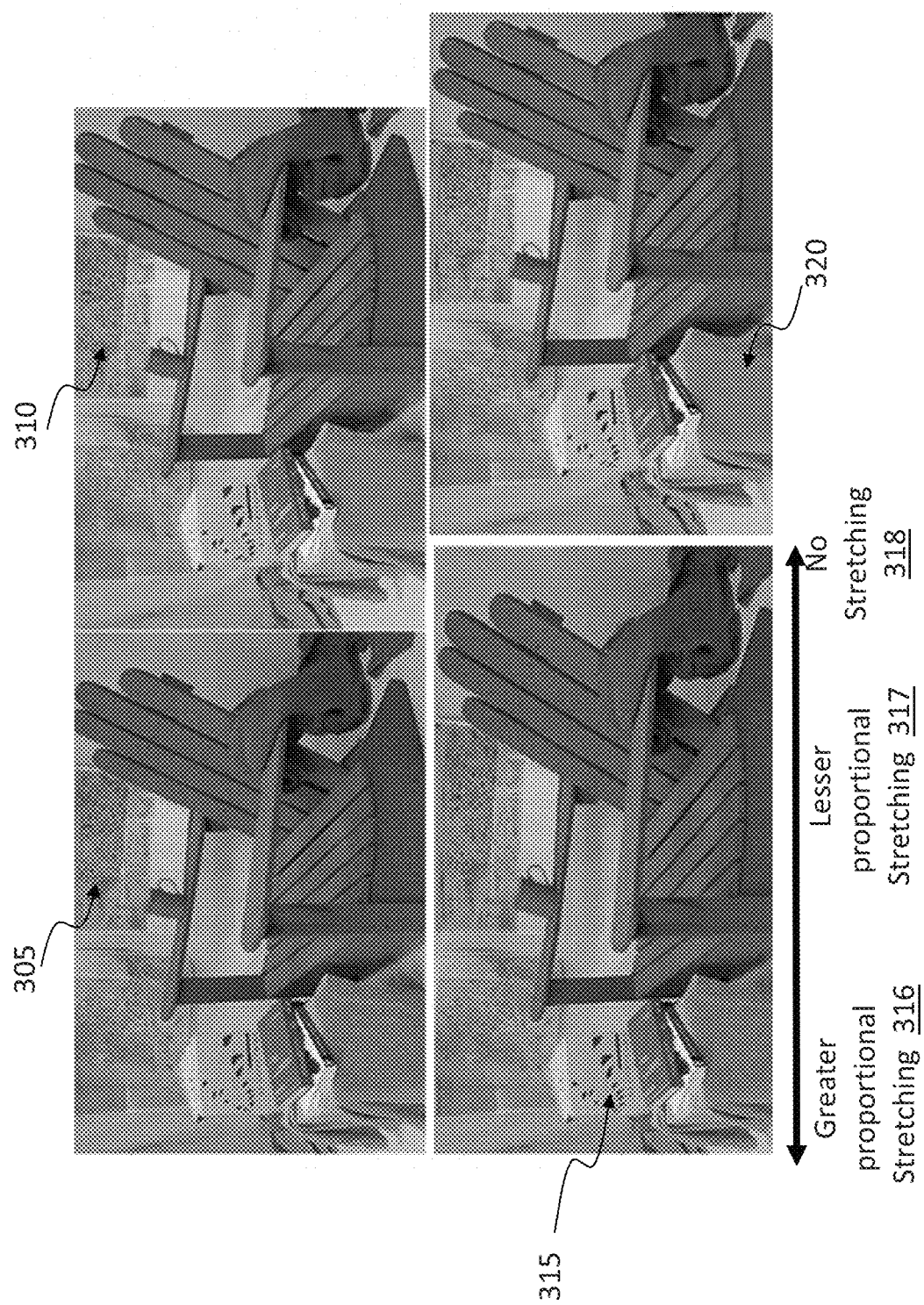
FIG. 3 is an illustration of sample images shown in original and adjusted forms.

FIG. 3 is an illustration of example sample images 300 shown in the original and adjusted forms. The original right video image 305 and original left video image 310 are shown. Right video image 315 has been stretched in this example. A greater proportion 316 of the adjustment has been applied to the left side of the right video image 315. A lesser proportion 317 of the adjustment has been applied to the middle of the right video image 315. No adjustment 318 has been made to the right edge of the right video image 315. The original left video image 320 is shown next to the adjusted right video image 315. The left and right video images of the sample images 300 are intentionally reversed to simulate a stereoscopic view when viewing the images cross eyed.

Figure 4:
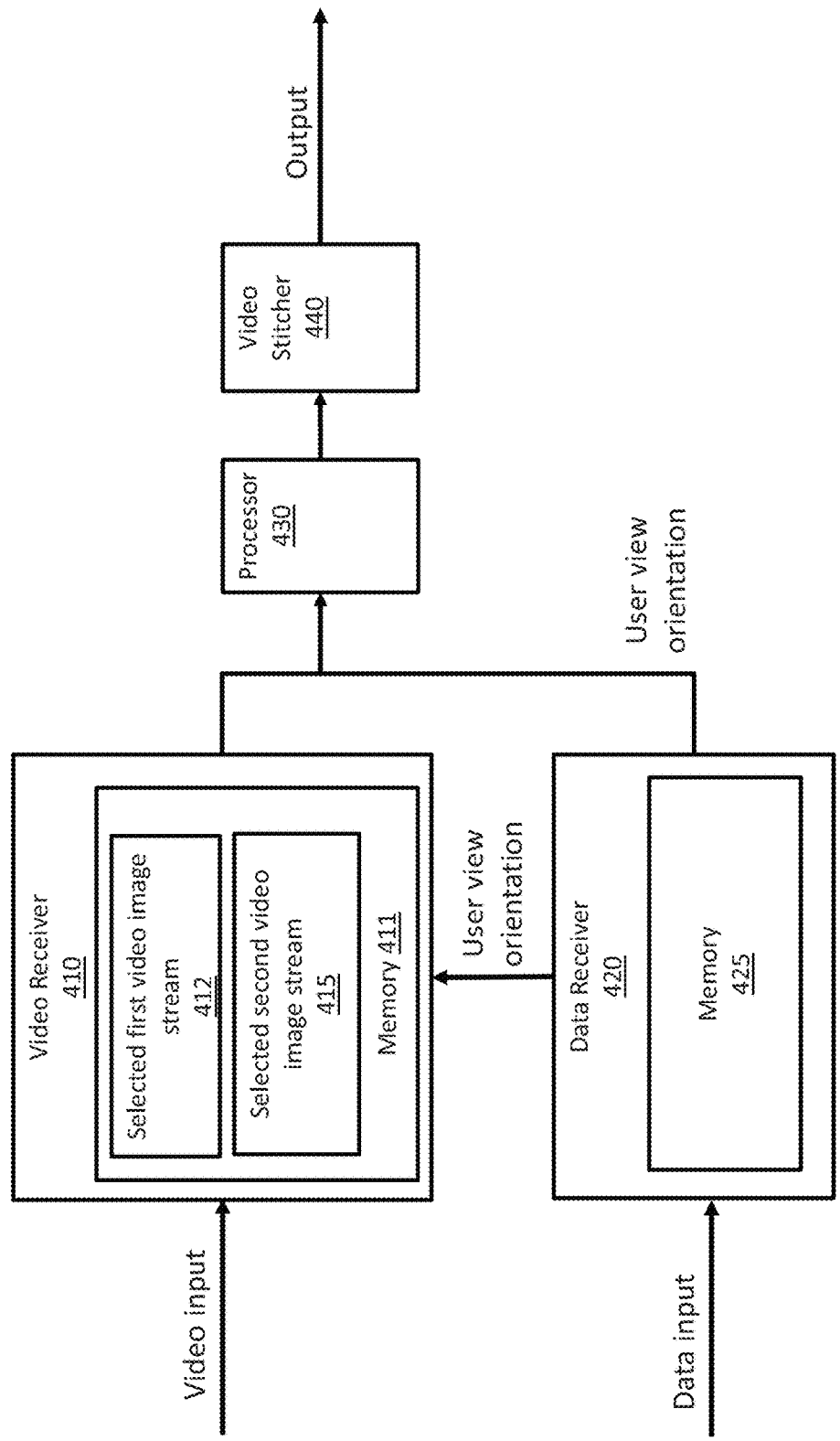
FIG. 4 is an illustration of a block diagram of an example distortion correction system.

FIG. 4 is an illustration of a block diagram of an example distortion correction system 400 for creating generated stereoscopic video image streams. System 400 comprises a video receiver 410, a data receiver 420, a processor 430, and a video stitcher 440. Video input is received by the video receiver 410, such as from a multiple camera rig or from a storage location. The video input includes at least two neighboring video image streams and their corresponding orientation parameters, captured at substantially the same time. The video image streams of the video input can be a captured scene from a live or recording of a live event.

As a separate process, data receiver 420 receives data input. Data input can be information received from the user, the display device being utilized by the user, and from other devices capable of identifying the user view orientation, such as the direction, angle, tilt, and rotation of the user's view relative to an identified origin orientation. Data input includes information on the user view orientation and is stored in a memory 425 of the data receiver 420. The user view orientation information is provided to the video receiver 410.

Orientation parameters of the video image streams of the video input can be analyzed utilizing the received user view orientation information. Video receiver 410 can determine a best fit first 412 and second 415 video image streams and place them in a memory 411. In some aspects, the memory 411 can be a buffer. The first video image stream 412 can be assigned as the left eye video image view perspective and the second video image stream 415 can be assigned as the right eye video image view perspective. The left/right assignments is arbitrary and the process can assign either of the first 412 and second 415 video image streams as the left or right eye view perspectives.

The first 412 and second 415 video image streams are typically captured at substantially the same time. Due to minor variations in circuitry and electronic distance traveled, the video image capture does not need to be simultaneous. Typically, the video image streams should be captured at a proximate time to maintain a consistent FPS experience for a user viewing a combined image from the first 412 and second 415 video image streams. The first 412 and second 415 video image streams are the video image streams captured by two neighboring, i.e., proximate, cameras. The video image streams can be in various physical orientations, for example, two cameras side by side, one on top of another, captured by cameras that are separated by one or more intervening cameras, and other orientations.

A processor 430 receives the first 412 and second 415 video image streams, and receives the user view orientation information from data receiver 420. Processor 430 can then determine the user view angle relative to the in-line view direction of either, or both, of the first 412 and second 415 video image streams. An example of a user view angle is shown as user view angle 234 illustrated in FIG. 2. Utilizing the determined user view angle, processor 430 can adjust at least one of the first 412 video image stream and second 415 video image stream. Such adjustment can be a compression or stretching of the video image streams, wherein such adjustment can be linear or non-linear. Processor 430 can also perform additional adjustments, such as correcting for gapping and clipping in the video image streams.

Video stitcher 440 takes in the first 412 adjusted video image stream and the second 415 adjusted video image stream and stitches the video image streams together to form a generated stereoscopic video image stream for output to at least one of a storage device, display device, and a network.

Video receiver 410, data receiver 420, processor 430, and video stitcher 440 represent a logical grouping of functionality of the distortion correction system 400. These functions can be combined in various fashions in one or more physical devices, for example, a single video processor can perform the functions described herein or a processor working in conjunction with a graphics processing unit can perform the functions described herein. Other combinations of physical components can also be implemented.

Figure 5:
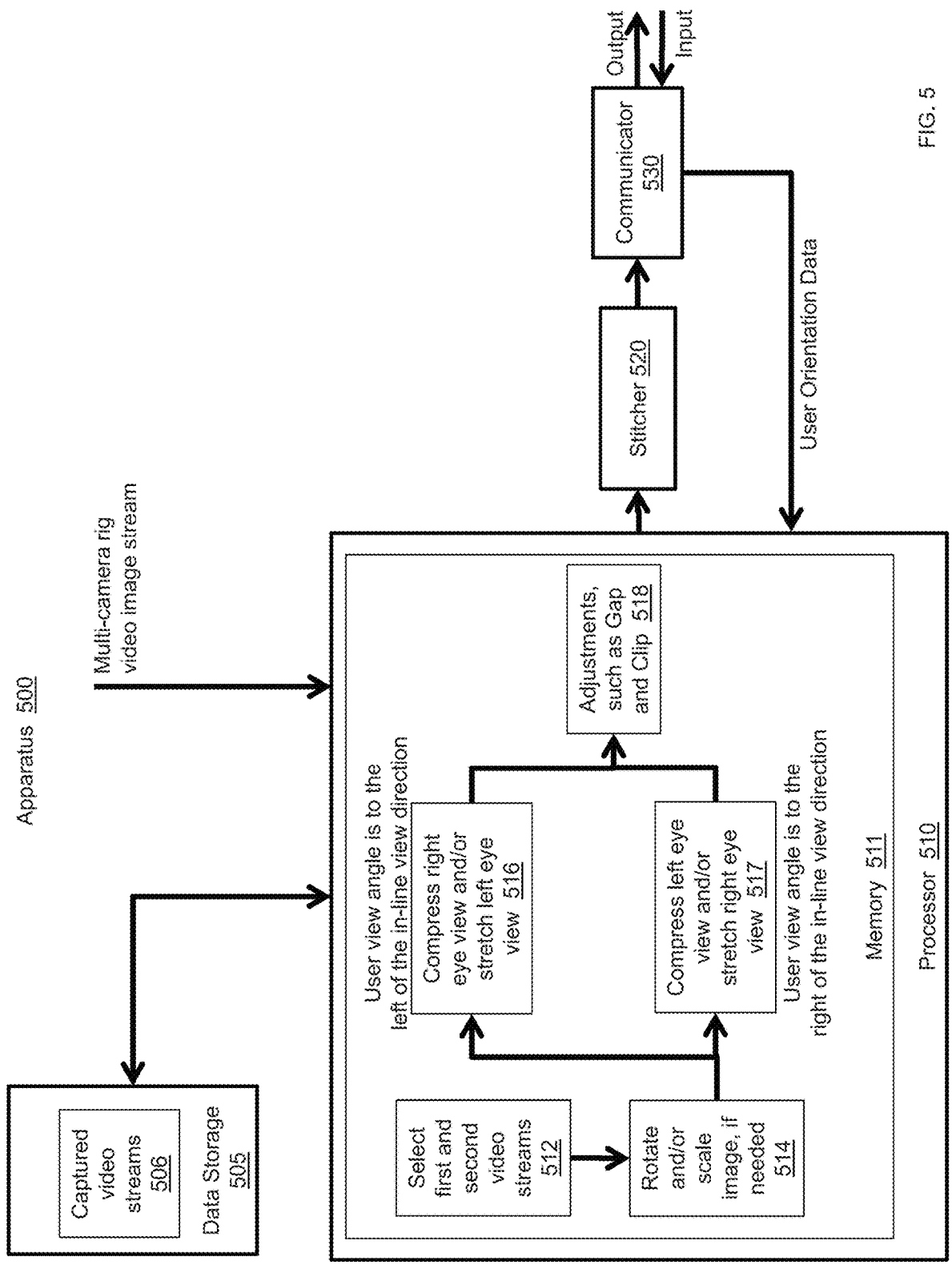
FIG. 5 is an illustration of a block diagram of an example distortion correction apparatus.

FIG. 5 is an illustration of a block diagram of an example distortion correction apparatus 500. Apparatus 500 can be a computing apparatus. Apparatus 500 can select a first and second video image stream, receive the user view orientation, and then adjust the video image streams for the user. Apparatus 500 includes a data storage 505, a processor 510, a stitcher 520, and a communicator 530. Data storage 505 can store video image streams 506 from a multiple camera rig. Alternatively, a multiple camera rig system can send the video image stream to processor 510 without the need for separate data storage 505.

Processor 510 can retrieve video image streams 506 from data storage 505, and store the retrieved video image streams in a memory 511 local to the processor 510. Memory 511 can be one or more of conventional computer memory, buffer, cache memory, hard disk, database, cloud storage, server system server, and other types of memory. Processor 510 can select different sets of video image streams 506 utilizing other factors, such as the orientation parameters for each of the video image streams. Alternatively, processor 510 can also receive a video image stream from a multiple camera rig system. The processor 510 can process the selected or received video image streams and provide the processed video image streams to the stitcher 520 that stitches the video image streams together to form a generated stereoscopic video image stream for output via the communicator 530 to at least one of a storage device, display device, and a network. Communicator 530 can provide communications with other systems or devices through communications input and output. The systems or devices can be a user display device, a user orientation device, other data storage systems, and other types of devices and systems. In one example, a user orientation device can send input to the apparatus 500 via communicator 530 which is communicated to the processor 510. Input to the communicator 530 can include, without limitation, information on the user view orientation relative to a display device and relative to the last displayed video image stream. The user view orientation data is used by the processor 510 to select the appropriate first and second video image streams 512 that were retrieved from the data storage 505 or received from a multiple camera rig system.

After selecting the best fit video image stream set, the processor 510 can perform multiple operations to process and correct the images. For example, if the first and second video image streams are not aligned closely enough, then the processor 510 can rotate, tilt, scale, shift, and otherwise manipulate the video image streams to bring them into better alignment as shown in 514. Utilizing the user view orientation data, the processor 510 can determine the user view angle compared to the selected first and second video image streams. Utilizing the user view angle comparison, one of the additional adjustments 516 and 517 can be made, if beneficial, such as performing a compression and stretching function on the appropriate video image streams. In an alternative aspect, the processor 510 can perform additional adjustments 518, such as correcting for gapping and clipping that can occur during previous adjustment processes.

The corrected and adjusted video image streams can be sent to the stitcher 520 to generate the generated stereoscopic video image stream that is sent to the communicator 530 and further sent to other processes and systems through the output.

The apparatus 500 is described through various logically divided devices, processes, and functions. The devices, processes, and functions can be physically grouped or separated. For example, processor 510 can be a single processor, a multi-chip processor, multiple processors, and different types of processors, such as a central processing unit and a graphics processing unit. Stitcher 520 can be included in processor 510 or can be a separate device. Other combinations are possible as well.

Figure 6:
FIG. 6 is an illustration of a flow diagram of an example method for correcting video image distortion.

FIG. 6 is an illustration of a flow diagram of an example method 600 for correcting video image distortion when viewing a stereoscopic image at an angle. Method 600 begins at a step 601. Proceeding to a step 605, the process identifies a set of video image streams. In a step 610, the process selects a first and second video image stream from the set and assigns one of the selected video image streams as the left eye video image stream and the other as the right eye video image stream. If beneficial, the video image streams can be adjusted, such as rotated, tilted, and scaled to bring them into better alignment. In a step 615, the process receives information regarding the user view orientation and determines the view angle perspective. In a step 620, the view angle perspective can be utilized to calculate the user perceived disparity parameter.

Proceeding to a step 625, the user perceived disparity parameter can be utilized with the first and second video image stream disparity parameter to calculate at least one of a proportional compress or proportional stretch of at least one of the video image streams. The proportional adjustment can be linear or non-linear. In a step 630, the process can adjust one or more of the first and second video image streams, using the compression and stretching parameters calculated in step 625. In an alternate aspect, step 630 can also provide corrections such as for gapping and clipping to the video image streams.

In a step 635, the first and second video image streams are stitched to create a generated stereoscopic video image stream. In a step 640, the stitched video image stream is communicated to another system, such as a data storage area, a user display device, and other systems. The method 600 ends at a step 650.

Figure 7:
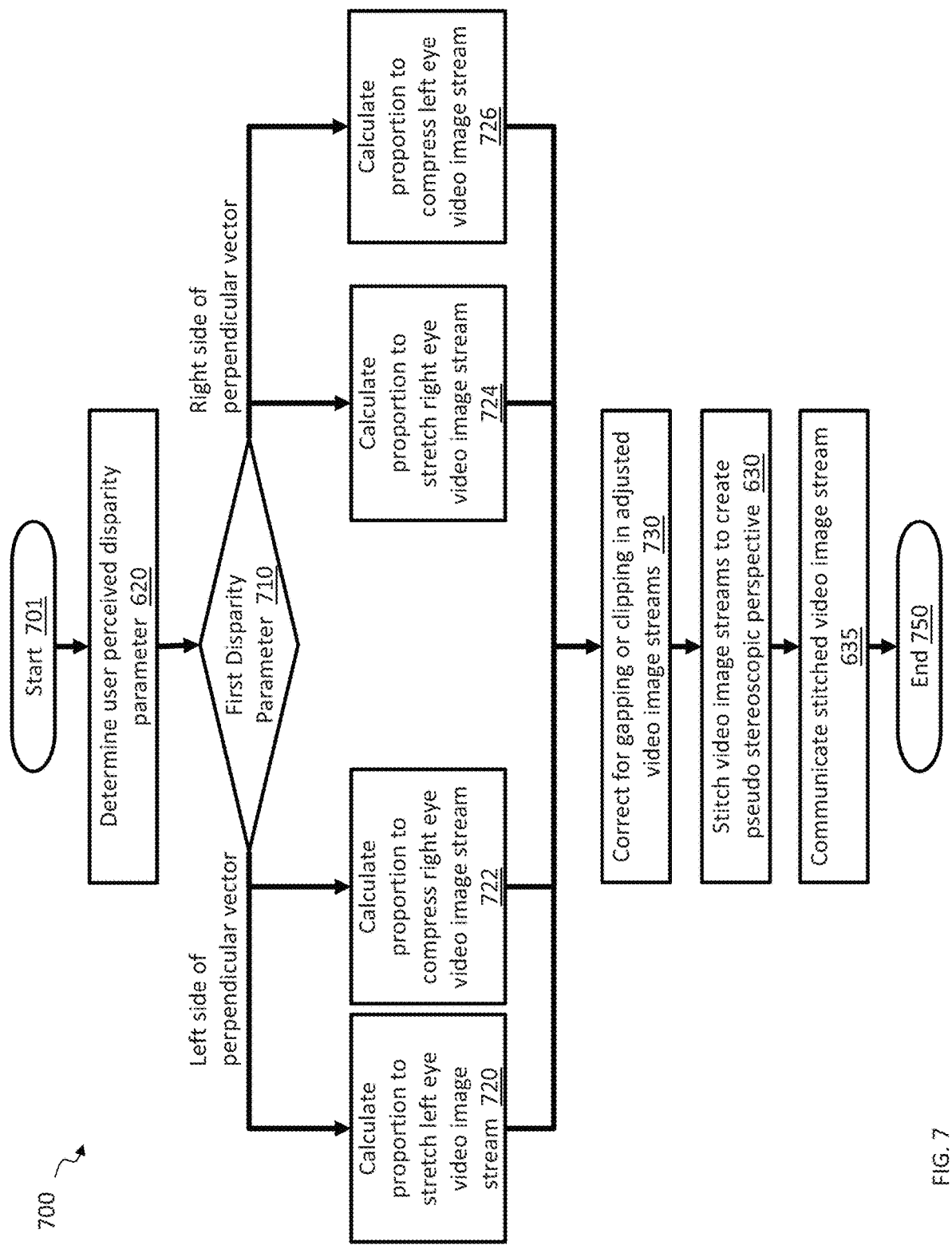
FIG. 7 is an illustration of a flow diagram of an example method, building on FIG. 6, providing additional steps for correcting video image distortion.

FIG. 7 is an illustration of a flow diagram of an example method 700 for correcting video image distortion, extending method 600. Method 700 begins at a step 701. Proceeding through method 600, through to step 620, as described above, the process determines the user perceived disparity parameter. In a decision step 710, the process determines in which quadrant the user view angle is relative to the in-line view direction. If the view angle is to the left of the in-line, or perpendicular, view vector, then the process proceeds to steps 720 and 722. Step 720 determines the proportion of the first video image stream (in this example assigned as the left eye video image stream) is stretched. The amount of stretch can be zero, meaning the video image stream is not adjusted. Step 722 determines the proportion of the second video image stream (in this example assigned as the right eye video image stream) is compressed. The amount of compression can be zero, meaning the video image stream is not adjusted.

Returning to decision step 710, if the view angle is to the right of the in-line, or perpendicular, view vector, then the process proceeds to steps 724 and 726. Step 724 determines the proportion of the second video image stream (in this example assigned as the right eye video image stream) is stretched. The amount of stretch can be zero, meaning the video image stream is not adjusted. Step 726 determines the proportion of the first video image stream (in this example assigned as the left eye video image stream) is compressed. The amount of compression can be zero, meaning the video image stream is not adjusted.

Proceeding from steps 720, 722, 724, and 726 is a step 730. The process can analyze the adjusted video image streams and correct for gapping, clipping, and other visual artifacts that can be corrected. The process proceeds to step 630 and 635 as described above. The method 700 ends at a step 750.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

As will be appreciated by one of skill in the art, the disclosure or parts thereof may be embodied as a method, system, or computer program product. Accordingly, the features disclosed herein, or at least some of the features, may take the form of an entirely hardware embodiment, an entirely software embodiment (including firmware, resident software, micro-code, etc.) or an embodiment combining software and hardware aspects all generally referred to herein as a "circuit" or "module." Some of the disclosed features may be embodied in or performed by various processors, such as digital data processors or computers, wherein the computers are programmed or store executable programs of sequences of software instructions to perform one or more of the steps of the methods. Thus, features or at least some of the features disclosed herein may take the form of a computer program product on a non-transitory computer-usable storage medium having computer-usable program code embodied in the medium. The software instructions of such programs can represent algorithms and be encoded in machine-executable form on non-transitory digital data storage media.

Thus, portions of disclosed examples may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

What is claimed is:

1. A method compensating for visual distortion of scene images captured by multiple cameras, comprising:
   receiving a left eye video image stream of said scene images from a first camera perspective and a right eye video image stream of said scene images from a second camera perspective;
   receiving directional information to indicate a user view direction relative to at least one of said left eye video image stream and said right eye video image stream;
   determining a first disparity parameter utilizing said directional information and an in-line view direction from at least one of said left eye video image stream and said right eye video image stream, wherein said first disparity parameter relates to a distance between left eye and right eye view vectors corresponding to said user view direction, wherein said first disparity parameter is based on a ratio between a second disparity parameter and an angle, and said angle is based on said in-line view direction and said user view direction; and
   calculating, utilizing said first disparity parameter, an adjusted left eye video image and an adjusted right eye video image, for each pair of video images in each respective video image stream, wherein said calculating comprises one of a stretching and compressing, for at least one of said left eye video image stream and said right eye video image stream.

2. The method as recited in claim 1, further comprising:
   generating at least one of an adjusted left eye video image stream and an adjusted right eye video image stream utilizing respective said adjusted left eye video images and said adjusted right eye video images; and
   stitching together said generated left eye video image stream and right eye video image stream, or one of said generated left eye video image stream and right eye video image stream and other of one of said left eye video image stream and right eye video image stream that is not adjusted, to create a generated stereoscopic video image stream of said scene.

3. The method as recited in claim 1, wherein said determining said first disparity parameter includes utilizing said ratio, wherein said second disparity parameter is a distance between an in-line view vector from each of said left eye video image stream and said right eye video image stream, and said angle is between a perpendicular vector extending from an image plane of one of said video image streams, and one of said view vectors that originates at a point where said perpendicular vector intersects said image plane and that extends in said user view direction.

4. The method as recited in claim 3, further comprising:
representing said first disparity parameter on a right side of said perpendicular vector and said calculating of said adjusted left eye video image is a non-linear compressing of said left eye video image proportionally to said first disparity parameter.

5. The method as recited in claim 3, further comprising:
representing said first disparity parameter on a right side of said perpendicular vector and said calculating of said adjusted right eye video image is a non-linear stretching of said right eye video image proportionally to said first disparity parameter.

6. The method as recited in claim 3, further comprising:
representing said first disparity parameter on a right side of said perpendicular vector and said calculating of said adjusted right eye video image is a non-linear stretching of said right video image proportionally to said first disparity parameter and said adjusted left eye video image adjustment is a non-linear compressing of said left eye video image proportionally to said first disparity parameter.

7. The method as recited in claim 3, further comprising:
representing said first disparity parameter on a left side of said perpendicular vector and said calculating of said adjusted right eye video image is a non-linear compressing of said right eye video image proportionally to said first disparity parameter.

8. The method as recited in claim 3, further comprising:
representing said first disparity parameter on a left side of said perpendicular vector and said calculating of said adjusted left eye video image is a non-linear stretching of said left eye video image proportionally to said first disparity parameter.

9. The method as recited in claim 3, further comprising:
representing said first disparity parameter on a left side of said perpendicular vector and said calculating of said adjusted left eye video image is a non-linear stretching of said left eye video image proportionally to said first disparity parameter and said adjusted right eye video image adjustment is a non-linear compressing of said right eye video image proportionally to said first disparity parameter.

10. The method as recited in claim 1, wherein said calculating includes proportionally adjusting at least one of said video images in proportion to a width of said video image, whereby a greater proportion of said video image adjustment is applied to a first side of said video image adjacent to other of said video image, and a lesser proportion of said video image adjustment is applied to a second side of said video image opposite other of said video image.

11. The method as recited in claim 1, further comprising:
correcting at least one of clipping and gapping, in at least one of said left eye video image stream and right eye video image stream by applying video image data from other of said video image.

12. The method as recited in claim 1, wherein said left eye video image stream and said right eye video image stream includes an overlapping margin.

13. The method as recited in claim 1, wherein said first camera perspective and said second camera perspective are captured proximate to each other and at substantially a same time.

14. The method as recited in claim 1, wherein said left eye video image stream is of a left eye image from an image photo pair, and said right eye video image stream is of a right eye image from said image photo pair.

15. A system to compensate for a user perceived distortion of a scene captured by multiple cameras, comprising:
a video receiver, capable to receive a first and second video image stream of said scene, where said second video image stream is captured proximate to said first video image stream and at substantially a same time;
a data receiver, capable to receive a user view direction of said scene, wherein said user view direction is relative to an in-line view direction of said first video image stream and said second video image stream; and
a processor, capable of determining a first disparity parameter utilizing said user view direction and said in-line view direction, and capable of adjusting said first video image stream and said second video image stream utilizing said first disparity parameter, wherein said adjusting comprises at least one of stretching and compressing at least one of said video image streams, and said first disparity parameter relates to a distance between left eye and right eye view vectors corresponding to said user view direction, wherein said first disparity parameter is based on a ratio between a second disparity parameter and an angle, and said angle is based on said in-line view direction and said user view direction.

16. The system of claim 15, further comprising:
a video stitcher processor capable of creating a generated stereoscopic video image stream from said adjusted first video image stream and second video image stream or from one of said adjusted first video image stream and second video image stream and other of one of said received first video image stream and second video image stream.

17. The system of claim 15, wherein said second disparity parameter is a distance between an in-line view vector from each of said first and second video image streams.

18. The system as recited in claim 15, wherein said adjusting of said first video image stream and second video image stream includes proportionally stretching one of said video image streams or compressing one of said video image streams.

19. The system as recited in claim 15, wherein said adjusting of said first video image stream and second video image stream includes proportionally stretching one of said video image streams and compressing other of said video image streams.

20. The system as recited in claim 15, wherein said adjusting of said first video image stream and second video image stream is proportional to a width of respective of said video image stream, whereby a first side of said video image stream adjacent to other of said video image stream has a greater proportion of adjustment, and a second side of said video image stream opposite to other of said video image stream has a lesser proportion of adjustment.

21. The system as recited in claim 15, wherein said adjusting said first video image stream and second video image stream includes adjusting clipping and gapping video image artifacts in at least one of said video image streams by utilizing video image data from other of said video image stream.

22. A computing apparatus to correct user perceived distortion of a scene captured by multiple cameras, comprising:
a storage device capable of storing at least a first video image stream and second video image stream of said scene received from said multiple cameras, and an adjusted left eye video image stream and an adjusted right eye video image stream of said scene;

a data receiver capable of receiving a user view direction of said scene, wherein said user view direction is relative to an in-line direction of said first video image stream and said second video image stream, and corresponds to a direction of a user view vector;

a video processor capable of generating said adjusted left eye video image stream and said adjusted right eye video image stream utilizing said first and second video image streams and an angular difference between said in-line direction and said received user view direction, wherein said generating comprises at least one of non-linear stretching and non-linear compressing of respective of said video image streams, and said generating applies to at least one of said left eye video image stream and right eye video image stream; and a video stitcher processor capable of generating a generated stereoscopic video image stream utilizing said adjusted left eye video image stream, said adjusted right eye video image stream, and said received first and second video image streams.

23. The computing apparatus of claim 22, wherein said video processor is capable of rotating, tilting, shifting, and scaling said first and second video image streams to provide an alignment of said video image streams.

24. The computing apparatus of claim 22, further comprising a communicator capable of transmitting via a communications network said generated stereoscopic video image stream to a VR display device.

* * * * *